US010794356B2

(12) United States Patent
Sung

(10) Patent No.: US 10,794,356 B2
(45) Date of Patent: Oct. 6, 2020

(54) WAVE POWER GENERATION DEVICE INCLUDING WIRE

(71) Applicant: INGINE, INC., Seoul (KR)

(72) Inventor: Yong Jun Sung, Guri-si (KR)

(73) Assignee: INGINE INC., Seoul (KR)

( * ) Notice: Subject to any disclaimer, the term of this patent is extended or adjusted under 35 U.S.C. 154(b) by 0 days.

(21) Appl. No.: 16/070,017

(22) PCT Filed: Jan. 13, 2016

(86) PCT No.: PCT/KR2016/000362
§ 371 (c)(1),
(2) Date: Jul. 13, 2018

(87) PCT Pub. No.: WO2017/122839
PCT Pub. Date: Jul. 20, 2017

(65) Prior Publication Data
US 2019/0024622 A1     Jan. 24, 2019

(30) Foreign Application Priority Data
Jan. 13, 2016 (KR) .................. 10-2016-0004286

(51) Int. Cl.
*F03B 13/16* (2006.01)
*D07B 1/02* (2006.01)
(Continued)

(52) U.S. Cl.
CPC ............ *F03B 13/16* (2013.01); *D07B 1/02* (2013.01); *D07B 1/025* (2013.01); *F03B 13/1885* (2013.01); *F16H 1/20* (2013.01); *F16H 55/36* (2013.01); *D07B 1/22* (2013.01);

*D07B 2201/1004* (2013.01); *D07B 2201/104* (2013.01); *D07B 2201/2009* (2013.01);
(Continued)

(58) Field of Classification Search
CPC combination set(s) only.
See application file for complete search history.

(56) References Cited

U.S. PATENT DOCUMENTS 5,415,593 A * 5/1995 Mathews .................. F16H 7/02
474/174
8,042,670 B2 * 10/2011 Bartos .................... F16D 41/14
192/43.1
(Continued)

FOREIGN PATENT DOCUMENTS

KR     10-1049518 B1    7/2011
KR     10-1477242 B1    12/2014
(Continued)

OTHER PUBLICATIONS

International Search Report dated Sep. 12, 2016, in corresponding International Application No. PCT/KR2016/000362 (2 pages in English, 2 pages in Korean).

*Primary Examiner* — Shafiq Mian
(74) *Attorney, Agent, or Firm* — The PL Law Group, PLLC

(57) ABSTRACT

A wave power generation device of the present invention includes: a buoy floating on the sea; a power generator generating electrical energy or hydraulic energy; a power transmitter connecting the buoy and the power generator to each other; and a wire having a first end and a second end connected to the buoy or the power transmitter and changing in tension by motions of the buoy.

17 Claims, 7 Drawing Sheets

(51) Int. Cl.
  *F16H 1/20* (2006.01)
  *F03B 13/18* (2006.01)
  *F16H 55/36* (2006.01)
  *D07B 1/22* (2006.01)

(52) U.S. Cl.
  CPC ........... *D07B 2201/2033* (2013.01); *D07B 2201/2041* (2013.01); *D07B 2205/201* (2013.01); *D07B 2205/2039* (2013.01); *D07B 2205/2046* (2013.01); *D07B 2401/2005* (2013.01); *D07B 2501/2061* (2013.01); *D07B 2501/2076* (2013.01); *F05B 2280/4005* (2013.01); *F05B 2280/4006* (2013.01); *Y02E 10/226* (2013.01); *Y02E 10/38* (2013.01)

(56) References Cited

U.S. PATENT DOCUMENTS

| | | | | |
|---|---|---|---|---|
| 8,402,894 | B1* | 3/2013 | McGuigan | F42B 12/68 102/374 |
| 9,869,056 | B2* | 1/2018 | Fukuda | D07B 9/00 |
| 9,995,269 | B2* | 6/2018 | Sung | F03B 13/1885 |
| 2009/0056327 | A1* | 3/2009 | Raikamo | F03B 13/181 60/506 |
| 2009/0066085 | A1* | 3/2009 | Gray | F03B 13/20 290/42 |
| 2010/0064679 | A1* | 3/2010 | Straume | F03B 13/1885 60/507 |
| 2012/0211699 | A1* | 8/2012 | Daniel | B01J 20/264 252/194 |
| 2013/0009402 | A1* | 1/2013 | Williams | F03B 13/182 290/53 |
| 2013/0205742 | A1* | 8/2013 | Smeets | D07B 1/0686 57/212 |
| 2014/0031526 | A1* | 1/2014 | Shoseyov | C07K 14/43518 530/356 |
| 2015/0275847 | A1* | 10/2015 | Sung | F16D 43/208 74/37 |
| 2016/0031685 | A1* | 2/2016 | Lawson | B66D 1/30 414/800 |

FOREIGN PATENT DOCUMENTS

KR  10-2015-0120896 A  10/2015
WO  WO 2010/078940 A2  7/2010

* cited by examiner

WAVE POWER GENERATION DEVICE INCLUDING WIRE

CROSS REFERENCE TO RELATED APPLICATION(S)

This application is a U.S. National Stage Application of International Application No. PCT/KR2016/000362, filed on Jan. 13, 2016, which claims the benefit under 35 USC 119(a) and 365(b) of Korean Patent Application No. 10-2016-0004286, filed on Jan. 13, 2016, in the Korean Intellectual Property Office.

TECHNICAL FIELD

The present invention relates to a wave power generation device receiving wave force in multiple-degrees of freedom through wires.

BACKGROUND ART

A wave is a high-density energy source for new and renewable energy and has attracted attention because it can be used r 24 hours a day to generate power. Research and development of wave power generation was started for the first time in 1940, but the market of wave power generation was established late in comparison to other new and renewable energies. A commercial wave power generation device appeared recently (in 2008) for the first time.

As the result of analyzing patents, theses, and markets, wave power generation devices that are studied now all around the world are as in the following table

TABLE 1

| Name | Developer | Place |
| --- | --- | --- |
| TAPCHAN | Norwave | Norway |
| McCabeWave Pump | Hydam Technology | Ireland |
| Europe Experiment Facgtory | EU Support | PICO Island in Portugal |
| LIMPET | Wavegen | Islay Island in UK |
| Wave Dragon | Wave Dragon ApS | Denmark |
| Archimedes Wave Swing | Teamwork Technology | Protugal |
| Denniss-Auld Turbine with OWC | Oceanlinx | Australia |
| Seabased | Uppsala Univ. | Sweden |
| Wave Star Energy | Wave Star Energy | Denmark |
| AquaBuOY | Finavera Renewables | US |
| SeaDog | Independent Natural Resources | US |
| Pelamis | Pelamis wave power | Portugal |
| Powerbuoy | Ocean Power Technologies | US, Spain |
| Salter Duck | Edinburgh Univ. | UK |
| Oyster | Aquamarine Power | UK |
| Coos Bay OPT Wave Park | Oregon Wave Energy Partners, LLC | US |
| CETO | Carnegie Wave Energy Limited | France |
| Falmouth | Fres. Olsen (Norway) | Falmouth in UK |

However, such existing wave power generation devices generate power only by receiving the vertical height difference of a float on the seawater when the heights of waves are changed, with 1-degree of freedom, or by receiving a pressure difference due to the height changes of waves with 1-degree of freedom.

There is no wave power generation device in the world that generates power with multiple-degrees of freedom using progressing waves coming to the seashore or the left-right inclinations of waves, in addition to a motion having 1-degree of freedom that corresponds to the height change of a wave. In the field of wave power generation devices, there are few studies about mechanical power transmission through wires.

As existing wave power generation devices, there are an oscillating wave column type that converts wave force into air pressure, a wave overtopping type that converts wave force into potential energy of fluid, and an anaconda type that converts wave force into pressure energy using a flexible hose, but these types are definitely different from the mechanical power generation device using wires of the present invention.

Further, even in the case of a mechanical power generation device, if the mass moment of inertia is increased due to a large and long power generation device when the device receives wave force, the wave force is consumed to overcome the mass moment of inertia, so it is required to overcome the problem that the power generation efficiency is reduced.

DISCLOSURE

Technical Problem

The present invention provides a high-efficiency and low-cost floating type wave power generation device that converts the kinetic energy or potential energy of waves into electrical energy or hydraulic energy.

Further, the present invention provides a wave power generation device that absorbs multiple-degree of freedom components of wave force such as the progressing wave of waves traveling in parallel with wind or the left-right inclination difference of waves generated laterally with respect to wind, in addition to the height change of a wave.

Further, the present invention provides a wave power generation device that can minimize friction, inertia resistance, and mass moment of inertia of wires and can maximize power transmission efficiency without consuming power.

The technical subject to implement in the present invention are not limited to the technical problems described above and other technical subjects that are not stated herein will be clearly understood by those skilled in the art from the following specifications.

Technical Solution

A wave power generation device of the present invention includes: a buoy floating on the sea; a power generator generating electrical energy or hydraulic energy; a power transmitter connecting the buoy and the power generator to each other; and a wire having a first end and a second end connected to the buoy or the power transmitter and changing in tension by motions of the buoy.

The tension of the wire may be input to the power generator through the power transmitter and a plurality of wires may be connected to the buoy in different directions.

The wire is made of a non-metallic material.

Advantageous Effects

According to the wave power generation device of the present invention, by mooring the buoy with a wire, it is possible to reduce the costs for initial installation and construction, as compared with pile type, self-weight type, and jacket type marine facilities.

According to the wave power generation device of the present invention, since power is generated by mechanically transmitting energy through a wire, it is possible to efficiently absorb motions in various directions.

According to the present invention, force or moment of 6-degrees of freedom including three-axial translational motional motions and three-axial rotational motions is received by wire tension. Accordingly, it is possible to change in tension of a wire fully in to energy and achieve a high-efficiency energy harvesting system. It is possible to completely absorb all energy of a floater that moves with multiple-degrees of freedom without loss.

Tension in the wire is changed with a change of wave force and the wire is moved with respect to the direction changer when the tension in the wire is changed. Accordingly, wave force that is an energy source is consumed as inertia force of the wire or elasticity of the wire that is bent, when wave force that is wasted in the middle of transmission without being transmitted to the power generation device is generated, the efficiency is deteriorated. According to the present invention, since elastic resistance or inertia resistance of the wire is reduced, it is possible to increase the transmission efficiency of wave force as well as the power generation efficiency.

According to the present invention, the non-metallic wire is excellent in corrosion resistance, durability, and lifetime, so it is possible to reduce the time and costs for installation and maintenance.

BEST MODE

Figure 1:
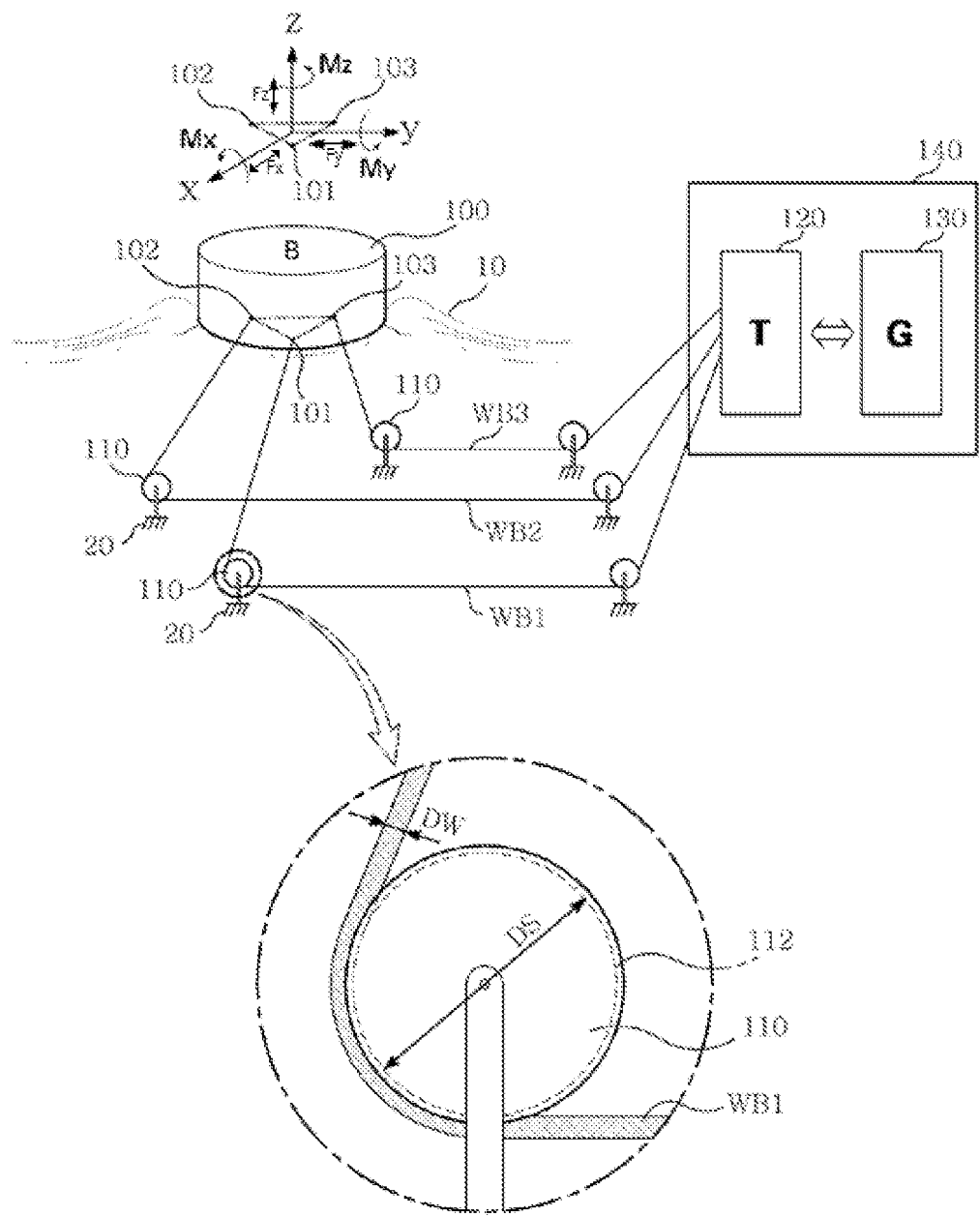
FIG. 1 is a perspective view conceptually showing a wave power generation device of the present invention.

Hereinafter, exemplary embodiments of the present invention will be described with reference to accompanying drawings. The sizes or shapes of components illustrated in the drawings may be exaggerated for the clarity and convenience of the following description. Further, the terminologies described below are terminologies determined in consideration of the configuration and operation in the present invention and may be construed in different ways by the intention of users and operators. Therefore, the definitions of the thereof should be construed based on the contents throughout the specification.

Referring to FIGS. 1 to 5, a wave power generation device of the present invention may include a buoy 100, a power generator 130, a power transmitter 120, and a wire.

The power generator 130 generates electrical energy or hydraulic energy by receiving power from a wire or an equalizer 150. The power generator 130 and the power transmitter 120 constitute a power generation unit 140.

The buoy 100 is a part that receives wave force on the seawater

A first axis, a second axis, and a third axis are defined as virtual rectangular coordinate axes that are perpendicular to one another. For example, the first axis may be x-axis, the second axis may be y-axis, and the third axis may be z-axis.

When the sea has high waves, the floater 100 can generate translational motion (Fx) with respect to the first axis, translational motion (Fy) with respect to the second axis, translational motion (Fz) with respect to the third axis, rotational motion (Mx) about the first axis, rotational motion (My) about the second axis, and rotational motion (Mz) about the third axis. Accordingly, the floater 100 generates translational motional or rotational motion of 6-degree of freedom kinetic components (Fx, Fy, Fz, Mx, My, and Mz) and generates kinetic energy by superposition of the kinetic components of 6-degrees of freedom.

A plurality of flexible wires may be connected to the buoy 100 to receive all of the 6-degree of freedom kinetic components of the kinetic energy. The wires may be ropes, wires made of synthetic resin, or chains.

Buoy wires WB1, WB2, and WB3 connected to the buoy 100 may include a first wire WB1, a second wire WB2, and a third wire WB3. The 6-degree of freedom kinetic components (Fx, Fy, Fz, Mx, My, and Mz) can be transmitted to the power generator 120 through one or some of the first wire WB1, the second wire WB2, and the third wire WB3.

In order to receive all of the 6-degree of freedom kinetic components, at least three wires are connected to the buoy 100 and the three fixed points of the three wires connected to the buoy 100 may be positioned at the apexes of a triangle.

The fixed point of the first wire WB1 on the buoy 100 may be defined as a first fixed point 101, the fixed point of the second wire WB2 on the buoy 100 may be defined as a second fixed point 102, and the fixed point of the third wire WB3 on the buoy 100 may be defined as a third fixed point 103. The wires may be spaced apart from one another to absorb multiple-degree of freedom energy.

A flexible wire can receive only tension and cannot receive compression or rotational moment. However, the distances among the wires are factors that can receive compression or rotational moment.

If only one wire is connected to the buoy 100 or a plurality of wires is connected to a common fixed point on the wire 100, the wire 100 can freely change directions. Accordingly, a restricting structure that can receive 6-degree of freedom motion cannot be achieved. In this case, it is difficult to absorb multiple-degree of freedom kinetic energy even if a plurality of wires is installed.

The triangular arrangement of wires with predetermined gaps can restrict rotation of the buoy 100. Accordingly, the force that restricts rotation of the buoy 100 is transmitted to at least any one of the wires and the tension of each of the wires is fully absorbed as energy by the power generator 120, so efficiency can be improved.

The structure of arranging wires with gaps has the function of a guide cable that prevent the buoy 100 from moving away when the buoy 100 is operated and the function of mooring the buoy 100 at a predetermined position. It is important, as described above, to space a plurality of wires from one another such that they restrict one another. According to the present invention, in order to increase energy absorption efficiency, wires are spaced apart from one another to restrict free direction change of the buoy 100.

The depth, width, and height of the buoy 100 are designed to be as similar as possible to one another so that the degrees of freedom of the buoy 100 absorbing energy are not limited. For example, it is possible to prevent the motion direction of the buoy 100 from being limited to specific-degrees of freedom by making the width, height, and depth of the buoy 100 having a spherical shape, a semispherical shape, a disc shape, and cylindrical shape similar to one another. It is preferable that the buoy 100 is not moved with the specific-degree of freedom, but is uniformly moved with multiple-degrees of freedom. To this end, it is preferable at least any one of the thickness, width, and height of the buoy 100 has a difference, which is an integer-time number, of another one.

As an embodiment, a first extension vector facing a first direction changer 110 from the first fixed point 101, a second extension vector facing a second direction changer 110 from the second fixed point 102, and a third extension vector facing a third direction changer 110 from the third fixed point 103 are three radial vectors facing the outside from the buoy 100.

The mechanical wave power generation device using wires of the present invention has high power transmission efficiency, so it does not matter to install only a small number of buoys 100, and accordingly, it is useful for small-scale wave power generation. Further, the wave power generation device is advantageous in entering the early-stage market of wave power generation that is not yet widely popularized. Accordingly, it is possible to achieve low-cost and high-efficiency energy harvesting, as compared with other new and renewable energies.

As an embodiment, it is possible to obtain a large amount of power even if installing one or few buoys 100, so the wire transmission type is the most suitable for small-scale on-shore wave power generation and can be more eco-friendly because it occupies a small installation area.

When the buoy 100 generates a motion, tension may be generated in some of the wires and may be removed in some of the wires. Tension may be generated in one wire or a plurality of wires by translational motion or rotational motion with 6-degrees of freedom in unspecific directions. According to the present invention, since all the wires are connected to the power transmitter 120, the entire kinetic energy of the buoy 100 can be fully absorbed by the power transmitter 120.

Wires are used to transmit wave force energy obtained on the sea to the land. The wave force to be received is proportioned to the volume of the number of buoys 100. In some case, the buoy 100 weighs several to tens of tons.

Wires have to resist deformation even if load is applied thereto in order to reduce a loss of energy that is consumed by elastic deformation.

Wires are repeatedly moved with respect to a specific reference point (e.g., the direction changer 110), so the mass of the wires should be small to prevent consumption of wave force due to inertia. If the modulus of elasticity of the wires is large, the wave force that is input to the buoy 100 may be consumed by elastic deformation of the wires. If the mass of the wires is large, the wave force that is input to the buoy 100 may be consumed by accelerated and decelerated movement of the wires. The larger the elastic resistance and inertia resistance of the wires, the larger the wave force that is transmitted to the power generator 130 may be.

Wires should be made of a low-deformation material or a light material to increase power generation efficiency. It is preferable that there is no tension deformation of wires to transmit power without a loss. It is preferable that the modulus of elasticity of the wires is small to prevent consumption of power due to bending of the wires. Wires should be made of a light material to reduce motion load thereof. It is preferable that the friction coefficient of wires is small to reduce friction consumed by the direction changer 110.

Accordingly, it is preferable that wires are made of a light and low-deformation material and non-metallic wires are suitable. It is possible to further satisfy the light-weight and low-deformation condition by using a synthetic fiber as the material of wires.

First ends of the wires may be connected to the buoy 100 and second ends of the wires may be connected to the power transmitter 120. Tension of the wires may be input to the power generator 130 through the power transmitter 120. A plurality of wires may be connected to one buoy 100 in different directions.

The larger the tensile strength of the wires, the larger the small-volume and light-weight wires can resist. It is preferable that the tensile strength of wires is 100 MPa or more.

As an embodiment, the diameter DW of the wires may be several centimeters (e.g., about 2 cm) and the cross-sectional areas of the wires may be several to tens of square centimeters (e.g., 3.14 square centimeters).

When the tensile strength of a wire is 100 MPa (which is about 1,000 kgf/cm$^2$), the cross-sectional area of the wire is 3.14 square centimeters if the diameter of the wire is several centimeters, so it can resist tension of about 3 tons. The weight of the buoy 100 or the wave force that is applied to the buoy 100 may be several to tens of tons. In terms of buoyancy or the amount of drain, the amount of drain by the buoy 100 when the buoy 100 is sunk in water may be at least 3 tons. Accordingly, considering the appropriate weight of a buoy, the maximum of wave force, and the amount of drain by a buoy having a length of several meters, the tensile strength of wires should be at least 100 MPa.

If the tensile strength of wires is less than 100 MPa, the following problems may occur. The diameters of wires may be excessively increased to secure rupture strength of the wires. Further, if the diameters wires are excessively large, it is difficult to ignore external force that is applied to the wires such as tides or waves. Further, the mass of wires may be excessive and excessive mass of wires may cause a loss of wave force. This is because wave force is consumed as inertia kinetic force. Further, if the diameters of wires are excessive, the direction changer that movably supports the wires may be excessively large in size. The larger the direction changer in size, the more the wave force may be consumed. If the direction changer is small relative to the diameters of wires, bending deformation of the wires is large, so curvature fatigue of the wires is also increased and the lifespan of the wires may be reduced.

In order to increase tensile strength in terms of a property of a material, it is preferable that wires are made of a synthetic fiber rather than a natural material. It is possible to increase load per unit area by improving the twisted structure of wires in addition to improving the property of the material.

As an embodiment, synthetic fibers that can be used for the wires are at least one of polyester fiber, polyethylene fiber, polypropylene fiber, and nylon fiber.

Polyester fiber is a polymer having ester bonding (—CO—O—) in the backbones of molecules. Polyester fiber may be thermoplastic saturated polyester or thermoplastic unsaturated polyester. Polyester fiber may be fabricated by mixing, heating, and polymerizing terephthalic acid and ethylene glycol. Elastic recovery is 97% for 2% extensions, so the elastic recovery can be considered as being very high, and particularly, the characteristic of immediate recovery after small extension is suitable for securing low elongation.

Polyethylene fiber is a chain-shaped highly polymerized compound fabricated by polymerizing ethylene. It may include both of low-density polyethylene and high-density polyethylene. Polyethylene fiber has density of about 0.9, so it can satisfy standards of the present invention in terms of specific gravity or tensile strength.

Polypropylene fiber has a melting point of 165° C. and can be continuously used under large load at 110° C. so it may be suitable for the wires of the present invention in terms of thermal resistance and durability. Further, the advantages of the density of about 0.9 and chemical resistance can satisfy the conditions for specific gravity and tensile strength of the present invention, similar to polyethylene.

Figure 5:
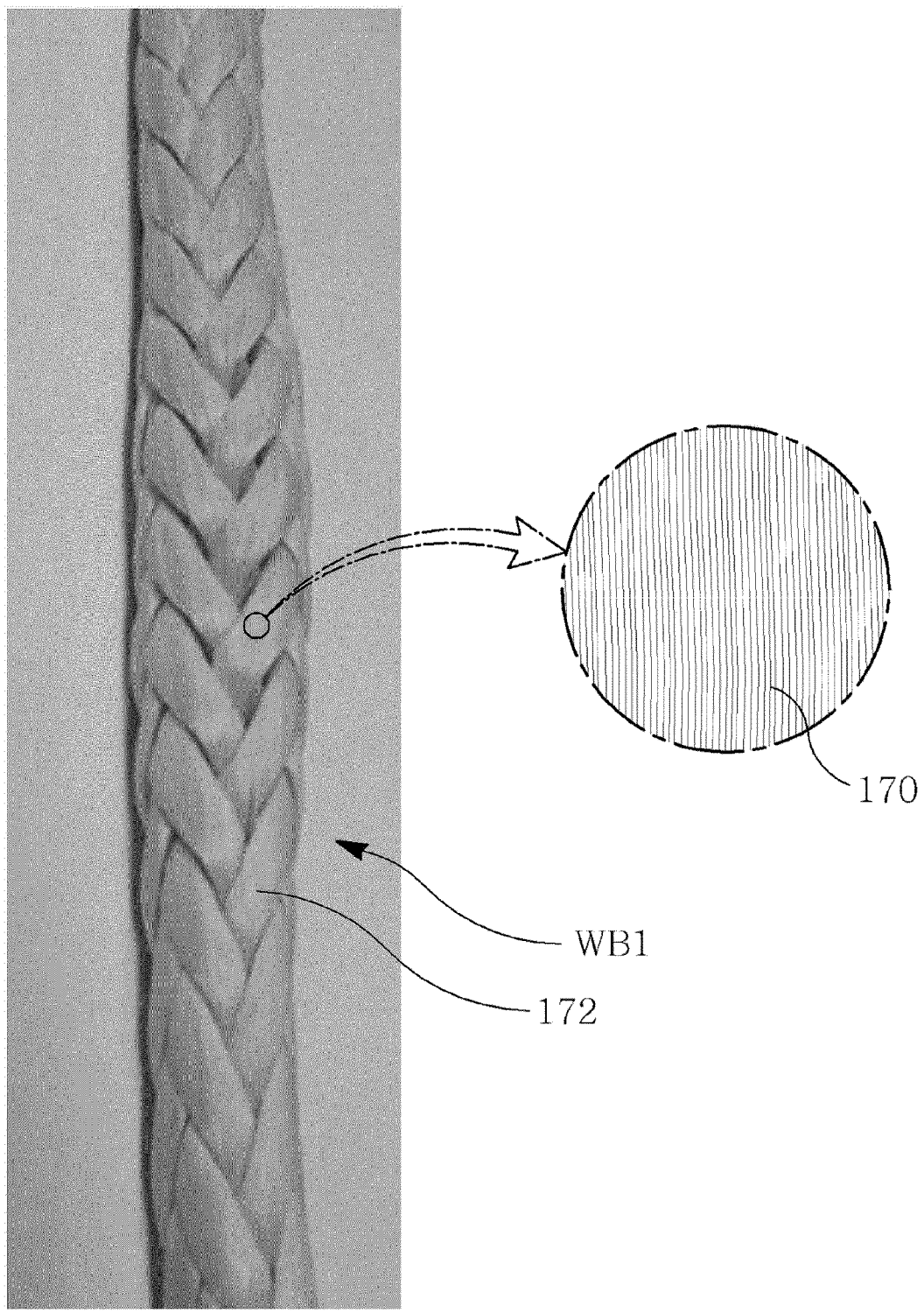
FIG. 5 provides a sample picture and an enlarged view of a wire of the present invention.

Referring to FIG. 5, a wire may be formed by twisting several strings 172. The strings 172 may be fabricated by gathering highly molecular filaments 170 having molecular weight over twenty thousands.

The length change of the wires should be small when tension is generated, in order to minimize a loss of energy that is transmitted to the power generator 130 through the power transmitter 120 from the buoy 100. This is because energy is consumed as much as the lengthwise deformation of the wires. Accordingly, it is preferable that the wires have small elongation even under large load and the wires may have a modulus of elongation under a strain limit.

It is preferable that the fracture elongation when the wires are broken by increasing tension is 15% or less. The elongation limit may be 15% that is the maximum of the fracture strain. For example, it is possible to minimize the lengthwise elongation of the wires by making the strings 172 by gathering polyester fibers, and then twisting the strings 172, as shown in FIG. 5.

If one of the polyester fibers is broken, adjacent polyester fibers can resist load instead of the broken one. Since the wires are fabricated by forming the strings 172 of several polyester fibers and then twisting the strings 172, the rupture elongation of the entire wire can be minimized, not limited to the rupture elongation of the polyester fibers.

Wave energy is consumed in various types before it is transmitted to the power generator 130. For example, the energy that is consumed without being transmitted to the power generator 130 as follows. Wave force energy is consumed as inertia force of all moving parts. For example, input energy can be consumed as the inertia (or inertia resistance) of the buoy 100 that is the product of acceleration and the weight of the buoy 100. Input energy can be consumed as inertia force (or inertia resistance) of the wire that is the product of acceleration and the weight of the wire. Input energy can be consumed as inertia force (or inertia resistance) of the power transmitter 120 that is the product angular acceleration and the mass moment of inertia of rotary shafts and gears in the power transmitter 120.

The smaller the mass of a moving wire, the smaller the loss of energy that is consumed as inertia force of the wire. It can be seen, as the result of testing various synthetic resins including polyester fibers, that it is preferable for the specific gravity of wires to be larger than 0.5 and smaller than 2 within the range satisfying the tensile strength and elongation conditions.

If a wire is made of metal, the specific gravity of the metal may be 5~10 and the ratio of wave force that is consumed as the inertia kinetic force of the wire may be excessively large. Further, if the specific gravity of the wire is excessively large, the wire has negative buoyancy, so it sinks under water, which may cause deterioration of power generation efficiency, difficulty in installation of the power generation device, and difficulty in maintenance. If the specific gravity of a wire is excessively small, the wire has positive buoyancy and floats on water, which may make it difficult to handle the wire when installing or maintaining the power generation device. Accordingly, it is preferable that a wire has neutral buoyancy, and for example, it is preferable that the specific gravity of the wire is larger than 0.5 and smaller than 2.

Meanwhile, the smaller the moisture absorption of a wire, the more advantageous it is. Most of the wire is sunk in water, so if the moisture absorption is large, the change in weight of the wire may be larger when it is in water than when it is on the ground. This may make it difficult to achieve a desired function and may accelerate wear of the wire.

According to experiments, it is preferable that the amount of an increase in weight of a wire when 24 hours has passed after the wire is soaked in water is less than 15% of the weight before the wire is soaked in water.

Furthermore, it is preferable that the wire does not generate physical and chemical changes with infrared light and is strong against salt. Since a lubricant, etc. may leak from the operation unit on the ground, it is preferable that the operation unit has oil resistance.

Furthermore, a wire may be heated at high temperature by friction in summer. The physical properties such as durability and wear resistance of the heated wire may be deteriorated, so it is preferable that the melting point of the wire is at least 70° C. or more.

The direction changer 110 may be fixed to the bottom of the sea and may be a mooring member that moors the float 110 at a predetermined position. The direction changer 110 may be a member that is fixed and rotated on the bottom of the sea such as a pulley, a sheave, a drum, and a wheel. The direction changer 110 may be fixed to the bottom of the sea by an anchoring member. The part that fixes the direction changer 110 to the bottom of the sea may be at least one of a lump of concrete, a tetra-port, an anchor, a rock net back, a pile, and a jacket.

The direction changer 110 can movably support the middle portion between first end and second end of the wire. The wire is wound around the direction changer 110 and the outer side of the direction changer 110 may be in sliding contact or rolling contact with the wire. A groove 112 is formed on the outer side of the direction changer 110 and the wire can be inserted in the groove.

Figure 2:
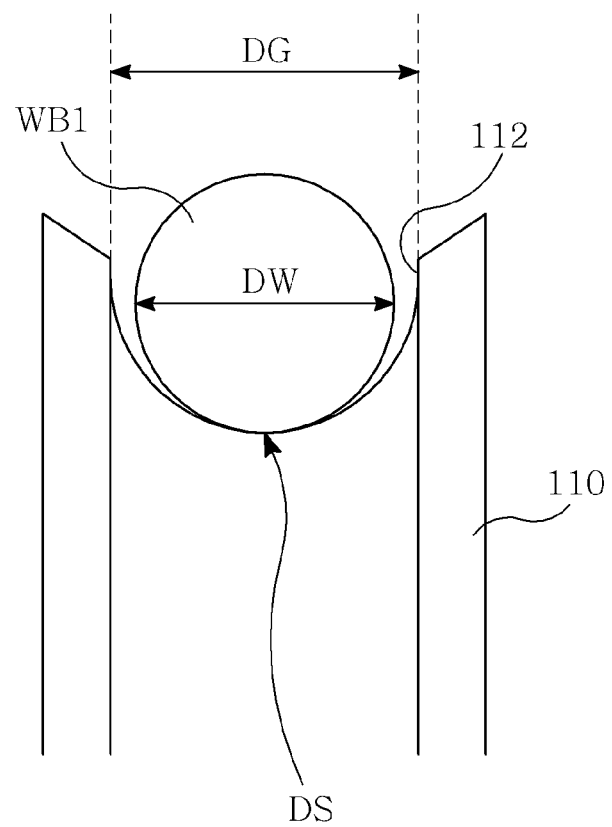
FIG. 2 is a cross-sectional view a direction changer and a buoy wire of the present invention.

Referring to FIG. 2, the friction between the wire and the direction changer 110 may be a factor that causes a loss of input energy. The power generation efficiency can be increased by reducing friction resistance. In order to reduce a frictional loss, it is preferable that the diameter DS of the direction changer 110 is sufficiently larger than the outer diameter DW or the maximum thickness of the wire.

When the wire is made of polyester fibers, the diameter magnification is preferably ten times. As an embodiment, when the wire has a circular cross-section, it is preferable the diameter DS of the direction changer 110 is ten or more times the diameter DW of the wire. When the wire has a flat belt-shaped cross-section, it is preferable that the diameter DS of the direction changer 110 is ten or more times the maximum thickness of the wire.

On the other hand, as for the groove 112 formed on the outer side of the direction changer 110, it is preferable that the width of the groove is 1.1 or more times the diameter DW of the wire having a circular cross-section. When the wire has a flat belt-shaped cross-section, it is preferable that the width DG of the groove 112 is 1.1 or more times the maximum thickness of the wire. This is because the wire is fitted in the groove 112 and the frictional loss may be increased if the gap between the wire and the groove 112 is small, and the wire may be separated out of the groove 112 while the direction changer is rotated when the gap between the wire and the groove 112 is large.

Figure 3:
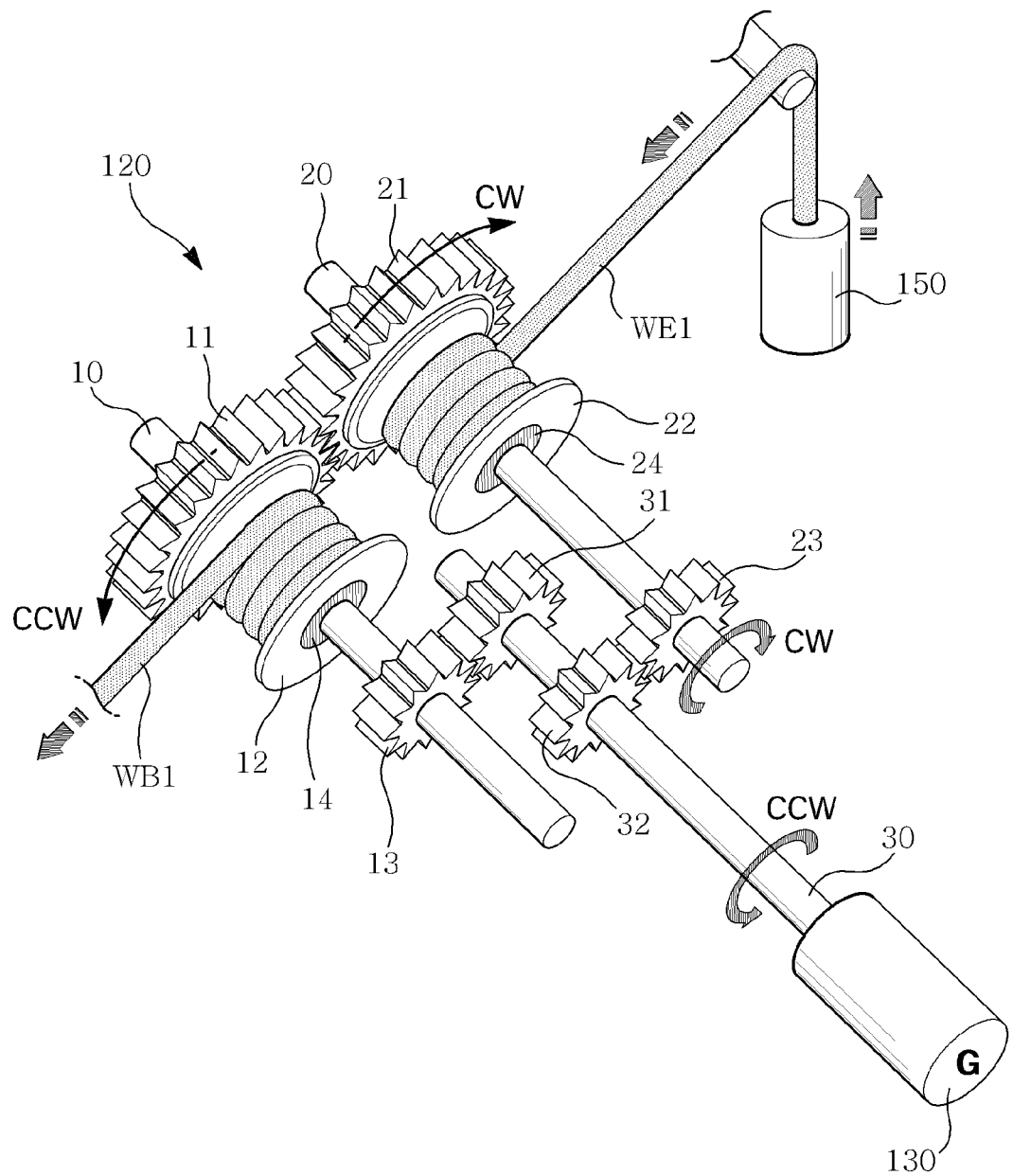
FIG. 3 is a perspective view showing a power transmitter when energy is generated by tension of a buoy wire of the present invention.
Figure 4:
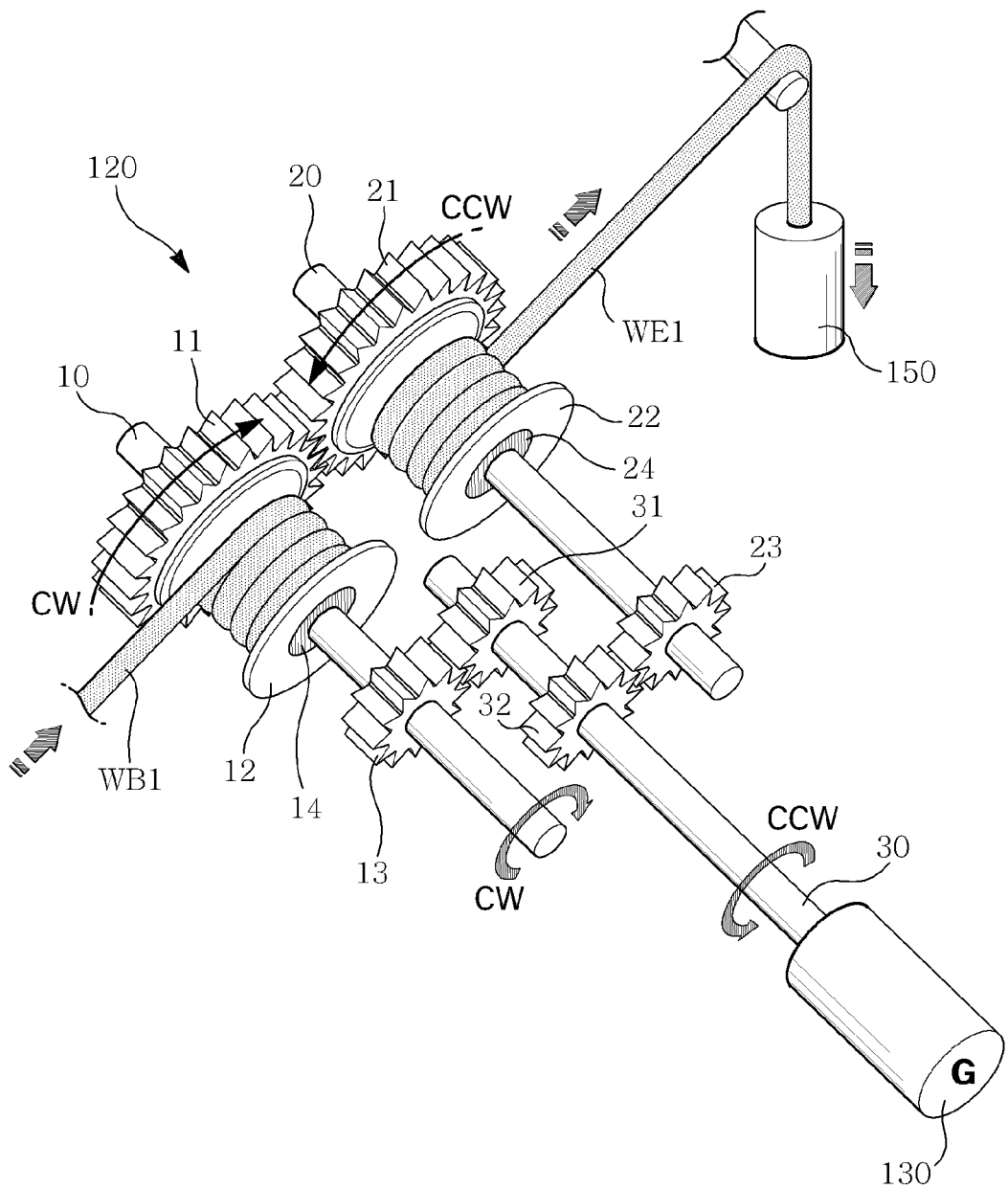
FIG. 4 is a perspective view showing a power transmitter when energy is generated by tension of an equalizer wire of the present invention.

Referring to FIGS. 3 and 4, the detailed configurations of the power transmitter 120, the power generator 130, and the equalizer 150 are shown.

The wires made of synthetic fibers may include buoy wires WB1, WB2, and WB3 and an equalizer wire WE1. The buoy wires WB1, WB2, and WB3 and the equalizer wire WE1 are separate wires, and a loss of power can be reduced when the wires are made of non-metallic materials.

The buoy wires WB1, WB2, and WB3 can connect the buoy 100 and the power transmitter 120 to each other.

First ends of the buoy wires WB1, WB2, and WB3 may be connected to the buoy 100 and second ends of the buoy wires WB1, WB2, and WB3 may be wound on a first drum 12 of the power transmitter 120. The middle portions of the buoy wires WB1, WB2, and WB3 may be movably supported by the direction changer 110.

The equalizer wire WE1 can connect the equalizer 150 and the power transmitter 120 to each other.

A first end of the equalizer wire WE1 may be connected to the equalizer 150 and a second end of the equalizer wire WE1 may be wound on a second drum 22 of the power transmitter 120.

When wave force is applied to the buoy 100 and the tension in the buoy wires WB1, WB2, and WB3 is increased, some of the wave force can be transmitted to the power generator 130 by the buoy wires WB1, WB2, and WB3. The other of the wave force can be stored as elastic energy or potential energy of the equalizer 150 by the equalizer wire WE1.

When the wave force applied to the buoy 100 is removed, some of the potential energy or the elastic energy stored in the equalizer 150 can be transmitted to the power generator 130 by the equalizer wire WE1. The other of the potential energy or the elastic energy can be used to return the buoy wires WB1, WB2, and WB3 into the initial state by winding them back.

The equalizer 150 providing returning force to the wire may be a weight or a spring.

The buoy 100 is a linear power source that generates a linear motion vertically or laterally with flow of seawater on or in the seawater. The buoy wires WB1, WB2, and WB3 are connected to the buoy 100 with predetermined gaps so that linear power can be transmitted to an input shaft 10 even if the buoy 100 moves in any direction.

The direction changer 110 is a fixing sheave that movably fixes the buoy wires WB1, WB2, and WB3 at a specific position. The buoy wires WB1, WB2, and WB3 connected to the buoy 100 independently connect several buoys 100 or several buoy wires WB1, WB2, and WB3 to the input shaft 10. The several buoys 100 or the several buoy wires WB1, WB2, and WB3 may be connected to the input shaft 10 in different directions or with different vector components.

The input shaft 10 is rotated by linear power transmitted from the several floaters 100 or the several floater wires WB1, WB2, and WB3. As many first power transmission members 11 may be fitted on the input shaft 10 as the floater wires WB1, WB2, and WB3 to receive power from the floater wires WB1, WB2, and WB3. The first power transmission members 11 may include first drums 12 on which the floater wires WB1, WB2, and WB3 are wound or unwound. The first drums 12 can rotate with the floater wires WB1, WB2, and WB3.

The first power transmission members 11 or the first drums 12 are coupled to the input shaft 10 through one-way rotary members 14 that allow for rotation only in one direction. The one-way rotary members 14 can be achieved using a one-way clutch or a ratchet gear.

In the embodiment shown in the figures, the one-way rotary members 14 can restrict clockwise rotation of the input shaft 10 and can allow free counterclockwise rotation of the input shaft 10.

When the buoy wires WB1, WB2, and WB3 are unwound from the first drums 12 by tension applied by the buoy 100, the first power transmission members 11 and the input shaft 10 are released and the input shaft 10 can be restricted to an output member 31, not driven by the first power transmission members 11 and the drums 12. The first drums 12 and the first power transmission members 11 are rotated in the opposite direction of the input shaft 10 that idles. The first power transmission members 11 transmit torque to second power transmission members 21.

An energy transmission shaft 20 is disposed in parallel with the input shaft 10 and receives tension from the buoy 10 by the second power transmission members 21 connected to the first power transmission members 11. A second drum 22 is coupled to the second power transmission member 21, so the second power transmission member 21 and the second drum 22 rotate together. The equalizer wire WE1 connected to the equalizer 150 is wound or unwound on the second drum 22.

The equalizer wire WE1, similar to the buoy wires WB1, WB2, and WB3, may be made of a rope, a synthetic resin, or a chain that can effectively transmit tension because it has mechanical flexibility, but is not elongated.

The equalizer wire WE1, similar to the buoy wires WB1, WB2, and WB3, is connected to the energy transmission shaft 20 through a one-way rotary member 24 using a one-way clutch or a ratchet gear. The one-way rotary member 24 connected to the equalizer wire WE1 may be rotated in the same direction as load rotation direction of the one-way rotary members 14 connected to the buoy wires WB1, WB2, and WB3. That is, the one-way rotary member 24 connected to the equalizer wire WE1 can restrict clockwise rotation of the energy transmission shaft 20 and can allow free counterclockwise rotation of the energy transmission shaft 20.

As shown in FIG. 3, the energy transmission shaft can be restricted, when the second power transmission member 21 is rotated by power transmitted from the first power transmission member 11. In this process, the input shaft 10 can freely rotate.

As shown in FIG. 4, when the second power transmission member 21 is rotated counterclockwise by energy transmitted from the equalizer 150, the energy transmission shaft 20 can freely rotate and the first power transmission member 11 and the input shaft 10 can rotate together.

The first power transmission member 11 and the second power transmission member 21 shown in FIGS. 3 and 4 are gears, but various well-known power transmission mechanisms such as a pulley and belt system, a sprocket and chain system, a link mechanism can be used.

The first power transmission member 11 and the second power transmission member 21 shown in FIGS. 3 and 4 are gears having the same gear ratio, but it is possible to efficiently transmit energy or adjust the pulled length of the equalizer wire WE1 to be smaller than the pulled lengths of the buoy wires WB1, WB2, and WB3 by appropriately adjusting the gear ratios of the first power transmission member 11 and the second power transmission member 21.

The one-way rotary members 14 connected to the buoy wires WB1, WB2, and WB3 and the one-way rotary member 24 connected to the equalizer wire WE1 are restricted in clockwise rotation and freely allows in counterclockwise rotation in FIGS. 3 and 4. However, the one-way rotary members 14 and 24 may be oppositely configured or may be configured such that the power generator 130 rotates clockwise, unlike that shown in the figures, when one-way clutches are provided for the output members 31 and 32.

FIGS. 3 and 4 shows an embodiment in which one-way rotary members 14 and 24 are respectively disposed on the input shaft 10 and the energy transmission shaft 20. However, this is an embodiment that is suitable when only one wire is connected to the input shaft 10 and only one first power transmission member 11 is provided. Though not shown in the figures, when several wires are connected to one input shaft 10 or several first power transmission members are fitted on one input shaft 10, more one-way rotary members 14 should be provided. This is because the wires are different in tension and the first power transmission members 11 have different rotational speeds. Accordingly, when one first input member 13 and two first power transmission members 11 are fitted on one input shaft 10, it is preferable to provide at least two one-way rotary members 14. For example, two one-way rotary members 14 are provided for the first input member 13 and one first power transmission member 11, or two one-way rotary members 14 may be provided for the first power transmission members 11, respectively.

That is, when N first input members 13 and first power transmission members 11 are fitted on the input shaft 10, at least N−1 one-way rotary members 14 may be provided.

This configuration is applied in the same way to the energy transmission shaft 20. That is, when M second input members 23 and second power transmission members 21 are fitted on the energy transmission shaft 20, it is preferable that at least M−1 one-way rotary members 24 are provided. N and M are any positive integers.

The output shaft 30 is disposed in parallel between the input shaft 10 and the energy transmission shaft 20, whereby it is rotated by power alternately transmitted from the input shaft 10 and the energy transmission shaft 20. The output shaft 30 can be directly or indirectly connected to the power generator 130 that generates power.

The first input member 13 is fitted on the input shaft 10 to restrict the input shaft 10 in one direction and rotates with the input shaft 10 to transmit power from the input shaft 10 and the energy transmission shaft 20 to the output shaft 30. The second input member 23 is fitted on the energy transmission shaft and rotates with the energy transmission shaft 20 while restricting it in one direction. A plurality of (two in this embodiment) output members 31 and 32 engaged with the first input member 13 and the second input member 23 to receive torque are fitted on the output shaft 30.

The equalizer 150 is connected to the energy transmission shaft 20 through the equalizer wire WE1 connected to the second drum 22, thereby storing energy and supplying accumulated energy. The equalizer 150 may be a spring that accumulates elastic energy or a weight that accumulates potential energy when the equalizer wire WE1 is wound on the second drum 22. The spring may be a coil spring, a plate spring, or a spiral spring. The spring can extend and accumulate elasticity when the equalizer wire WE1 is wound on the second drum 22. When the tension in the buoy wires WB1, WB2, and WB3 is removed, the spring contracts and pulls the equalizer wire WE1, as shown in FIG. 4, whereby the second drum 22 is rotated and energy is transmitted to the power generator 130.

On the other hand, the equalizer 150 may be a weight that moves upward and accumulates energy when the equalizer wire WE1 is wound on the second drum 22, as shown in FIG. 3.

When power transmitted from the buoy 100 is reduced, the equalizer 150 that corresponds to a weight of FIG. 4 can rotate the input shaft 10 and the output shaft 30 by rotating the second drum 22 by moving down.

In the embodiment shown in the figures, one input shaft 10, one energy transmission shaft 20, and one output shaft 30 are provided and the output shaft 30 receives power from the input shaft 10 and the energy transmission shaft 20. However, a plurality of input shafts 10, a plurality of energy transmission shafts 20, and one output shaft 30 may be provided such that the output shaft 30 is rotated by power transmitted from the input shafts 10 and the energy transmission shafts 20 to perform wave power generation. In this case, if torque is transmitted from the input shafts 10 and the energy transmission shafts 20 that have different cycles, the rotational speed of the output shaft 30 can be uniform. Accordingly, it is possible to maintain uniform number of revolutions of a power generator connected to the input shaft 30 in a wave power generation device that generates power using wave force having a long cycle, so it is possible to stably generate power.

Figure 6:
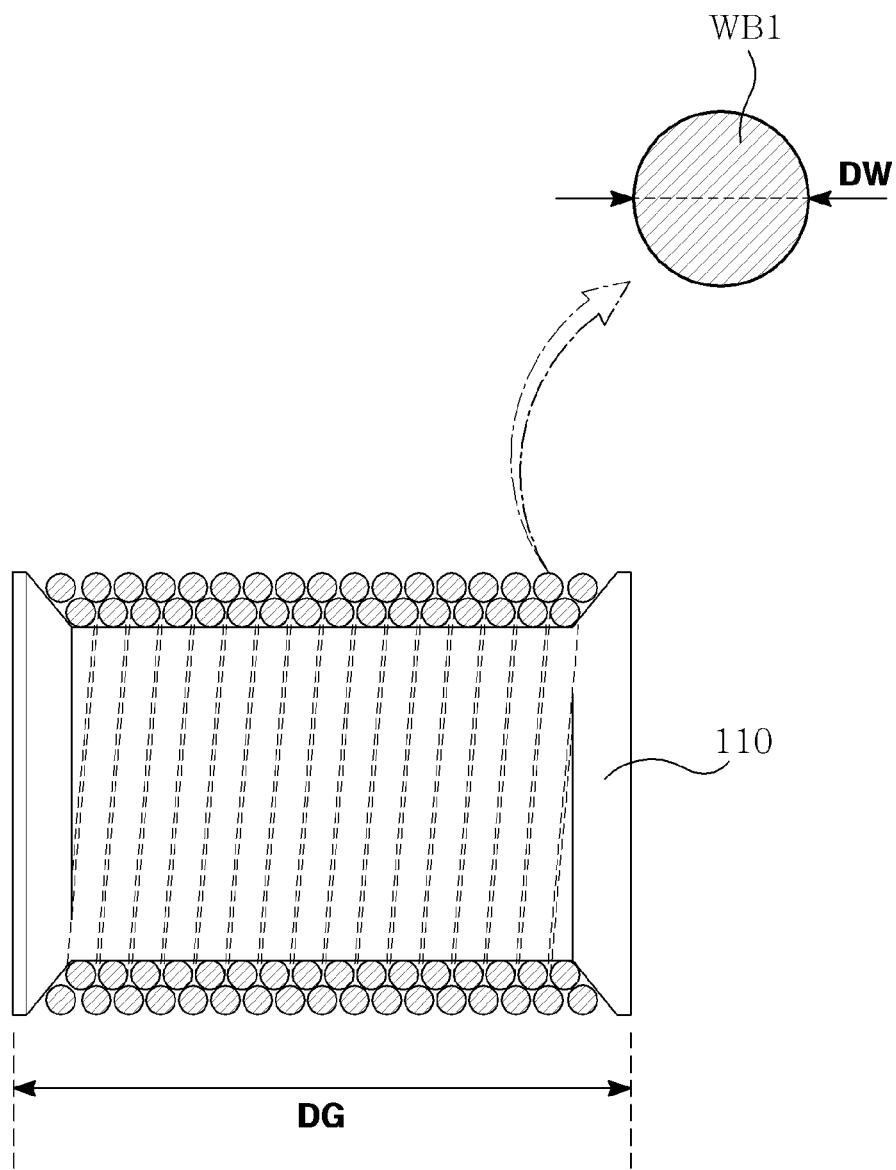
FIG. 6 is a cross-sectional view of a direction changer when a wire of the present invention has a circular cross-section.
Figure 7:
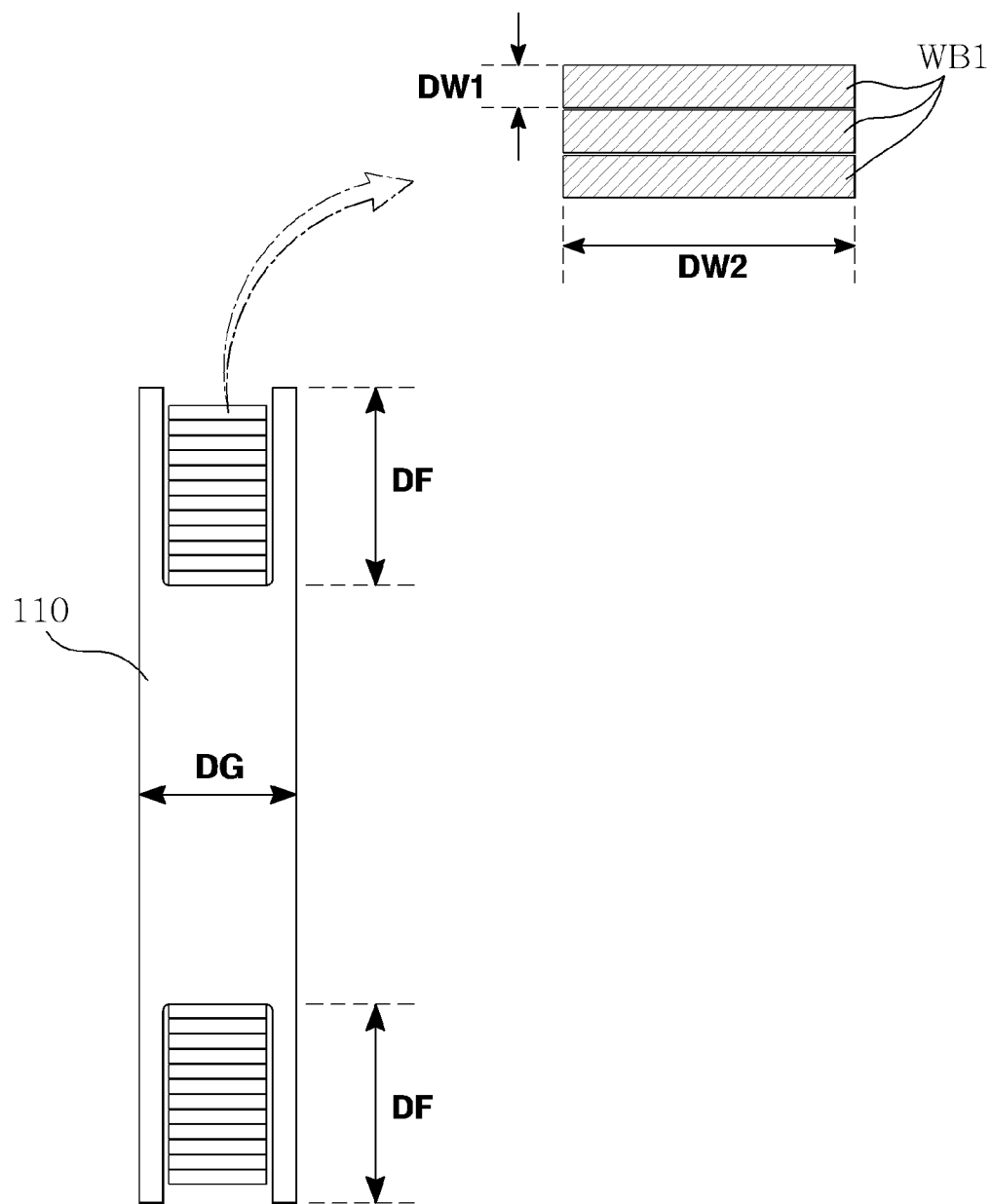
FIG. 7 is a cross-sectional view of a direction changer when a wire of the present invention is flat.

FIG. 6 is a cross-sectional view of a direction changer when a wire of the present invention has a circular cross-section. When all wires that are used in the wave power generation device, including the buoy wires WB1, WB2, and WB3 and the equalizer wires WE1, WE2, and WE3 have a circular cross-section, when the wound lengths of the wires are large or the winding numbers of times are large, the wires should be wound at different positions in the axial direction of the direction changer 110, whereby the winding thicknesses can be reduced. Accordingly, the width of the direction changer 110 or the width DG of the groove can be increased. When the width of the direction changer 110 or the width DG of the groove is increased, a bending moment that bends the direction changer 110 with respect to its rotational center may be applied to the direction changer 110, so the size of the direction changer 110 may be increased. FIG. 7 shows an embodiment for solving this problem.

FIG. 7 is a cross-sectional view of the direction changer 110 when a wire of the present invention is flat. When the wire has a flat cross-section, the wire can be wound at the same position in the axial direction of the direction changer 110. Accordingly, even if the winding length or the winding number of times is increased, there is no need for increasing the width of the direction changer 110 or the width DG of the groove. In the embodiment shown in FIG. 7, a bending moment that bends the direction changer with respect to its rotational center may be less applied to the direction changer.

Assuming that the wires shown in FIGS. 6 and 7 have the same cross-section, it is possible to reduce the thickness DW1 perpendicular to the wound surface by making the cross-section of the wire WB1 flat. Since the wire is stacked in the radial direction of the direction changer 110 when it is continuously wound, it is not required to increase the axial length of the direction changer 110. Accordingly, a bending moment that is applied to the direction changer 110 can be reduced and the durability or lifespan of a bearing or a lubricant in the direction changer 110 can be improved.

For example, it is assumed that the diameter DS of the direction changer 110 is thirty times the diameter DW of a wire having a circular cross-section. As the diameter DW of the wire or the winding number of times is increased, the diameter DS of the direction changer may be increased. By making the thickness DW1 of a wire having a rectangular cross-section be ⅕ of the diameter DW of the wire having a circular cross-section, it is possible to reduce the diameter DS of the direction changer to ⅕, as compared with using a wire having a circular cross-section.

Furthermore, when a wire having a rectangular cross-section is used and the wire is stacked in the radial direction of the direction changer 110, it is possible to reduce the width of the direction changer 110 or the width DG of the groove. It is preferable to make the depth DF of the groove of the direction changer 110 larger than when using a wire having a circular cross-section in order to receive a wire wound in several layers.

Even if a wire having a flat rectangular cross-section is used, it is possible to resist the same tension as long as the cross-sectional area of the wire is the same as that of a wire having a circular cross-section, so it is possible to resist the same load.

Accordingly, by using a wire having a flat rectangular cross-section, it is possible to resist the same load or tension and it is also possible to reduce the diameter of the direction changer 110. Further, it is possible to reduce the width of the direction changer 110, the bending moment that is applied to the direction changer 110, and the size of the direction changer 110.

Although embodiments of the present invention were described above, they are only examples and it would be understood that the present invention may be changed and modified and equivalent embodiments may be achieved by those skilled in the art. Therefore, the technical protective region of the present invention should be determined by the following claims.

The invention claimed is:

1. A wave power generation device comprising:
a buoy floating on the sea;
a power generator generating electrical energy or hydraulic energy;
a power transmitter connecting the buoy and the power generator to each other; and
a wire connected to the buoy or the power transmitter and changing in tension by motions of the buoy;
wherein the tension of the wire is input to the power generator through the power transmitter and a plurality of wires is connected to the buoy in different directions;
the wire includes pluralities of first wires, second wires, and third wires that are connected to the buoy, and
when a first axis, a second axis, and a third axis are defined as virtual rectangular coordinate axes that are perpendicular to one another, translational motion energy of the buoy on the first axis, translational motion energy of the buoy on the second axis, translational motion energy of the buoy on the third axis, rotational motion energy of the buoy about the first axis, rotational motion energy of the buoy about the second axis, and rotational motion energy of the buoy about the third axis are transmitted to the power transmitter through at least one of the first wires, the second wires, and the third wires.

2. The wave power generation device of claim 1, wherein the wire is made of a non-metallic material.

3. The wave power generation device of claim 1, wherein the wire is formed by twisting several strings and the strings are fabricated by gathering highly molecular filaments having molecular weight over twenty thousands.

4. The wave power generation device of claim 1, wherein the wire is made of at least one of polyester fiber, polyethylene fiber, polypropylene fiber, and nylon fiber.

5. The wave power generation device of claim 1, wherein the wire has low elongation lower under an elongation limit to minimize a loss of energy that is transmitted to the power generator through the power transmitter from the buoy.

6. The wave power generation device of claim 1, wherein rupture elongation of the wire when the wire is broken by increasing tension is 15% or less.

7. The wave power generation device of claim 1, wherein tensile strength of the wire is 100 MPa or more.

8. The wave power generation device of claim 1, wherein specific gravity of the wire is larger than 0.5 and smaller than 2 to reduce inertia resistance of the moving wire.

9. The wave power generation device of claim 1, wherein a diameter of a direction changer that movably supports a middle portion between a first end and a second end of the wire is ten or more times of a diameter of the wire or ten or more times a maximum thickness of the wire.

10. The wave power generation device of claim 1, wherein a direction changer that movably supports a middle portion between a first end and a second end of the wire is provided,
a groove in which the wire is wound is formed on an outer side of the direction changer, and
a width of the groove is 1.1 or more times a diameter of the wire or 1.1 or more times a maximum thickness of the wire.

11. The wave power generation device of claim 1, wherein the wire includes a buoy wire and an equalizer wire,
a first end of the buoy wire is connected to the buoy, a second end of the buoy wire is wound on the power transmitter, and a middle portion of the buoy wire is movably supported by a direction changer,
a first end of the equalizer wire is connected to an equalizer and a second end of the equalizer wire is wound on the power transmitter, and
the buoy wire and the equalizer wire are separate wires made of non-metallic materials.

12. The wave power generation device of claim 1, wherein the wire is made of synthetic resin and includes a buoy wire and an equalizer wire,
the buoy wire connects the buoy and the power transmitter to each other,
the equalizer wire connects the equalizer and the power transmitter to each other,
when wave force is applied to the buoy and tension in the buoy wire is increased, some of the wave force is transmitted to the power generator by the buoy wire and the other of the wave force is stored as elastic energy or potential energy of the equalizer by the equalizer wire, and
when the wave force applied to the buoy is removed, some of the potential energy or the elastic energy stored in the equalizer is transmitted to the power generator by the equalizer wire and the other of the potential energy or the elastic energy is used to wind back the buoy wire.

13. The wave power generation device of claim 1, wherein at least three wires are connected to the buoy, and three fixed points of the three wires on the buoy are positioned at apexes of a virtual triangle.

14. The wave power generation device of claim 1, wherein
a points where the first wire are fixed to the buoy are defined as first fixed points, points where the second wires are fixed to the buoy are defined as second fixed points, and points where the third wires are fixed to the buoy are defined as third fixed points, and
first extension vectors facing a first direction changer from the first fixed points, second extension vectors facing a second direction changer from the second fixed points, and third extension vectors facing a third direction changer from the third fixed points are arranged in a radial direction to face an outside of the buoy from the buoy.

15. The wave power generation device of claim 1, wherein the wire includes a buoy wire and an equalizer wire,
a first end of the buoy wire is connected to the buoy a second end of the buoy wire is connected to a first power transmission member on an input shaft of the power transmitter,
a first end of the equalizer wire is connected to an equalizer and a second end of the equalizer wire is connected to a second power transmission member on an energy transmission shaft of the power transmitter,
the input shaft and the energy transmission shaft are connected to the power generator by a first input member or a second input member,
when N first input members and first power transmission members are disposed on the input shaft, at least N−1 one-way rotary members are disposed on the input shaft, or
when M second input members and second power transmission members are disposed on the energy transmission shaft, at least M−1 one-way rotary members are disposed on the energy transmission shaft.

16. The wave power generation device of claim 1, wherein the wire is made of synthetic resin, and
a weight increase of the wire after 24 hours has passed after the wire is soaked in water is less than 15% of weight before the wire is soaked in the water.

17. The wave power generation device of claim 1, wherein the wire has a rectangular cross-section of which thickness perpendicular to a wound surface is small.

* * * * *